(12) United States Patent
Pepples (10) Patent No.: US 7,444,878 B1
(45) Date of Patent: Nov. 4, 2008

(54) RESONANT FREQUENCY PRESSURE SENSOR

(75) Inventor: David R. Pepples, Mason, OH (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 11/554,116

(22) Filed: Oct. 30, 2006

(51) Int. Cl.
 *G01L 9/10* (2006.01)
(52) U.S. Cl. .......................... 73/722; 73/728
(58) Field of Classification Search ............ 73/722, 73/728; 340/447
 See application file for complete search history.

(56) References Cited

U.S. PATENT DOCUMENTS

| | | | |
|---|---|---|---|
| 4,227,182 A | 10/1980 | Ogasawara et al. | |
| 4,265,252 A | 5/1981 | Chubbuck et al. | |
| 4,385,636 A | 5/1983 | Cosman | |
| 4,866,988 A | 9/1989 | Brown | |
| 5,085,080 A | 2/1992 | Yu | |
| 6,085,594 A | 7/2000 | Gutierrez et al. | |
| 6,277,078 B1 | 8/2001 | Porat et al. | |
| 6,278,379 B1 | 8/2001 | Allen et al. | |
| 6,532,822 B1 | 3/2003 | Boyd | |
| 6,609,419 B1 | 8/2003 | Bankart et al. | |
| 6,919,521 B2 | 7/2005 | Miller et al. | |
| 6,926,670 B2 | 8/2005 | Rich et al. | |
| 2003/0101822 A1 | 6/2003 | Atherton | |
| 2004/0153279 A1 | 8/2004 | Ye et al. | |
| 2004/0159158 A1 | 8/2004 | Forster | |
| 2005/0252300 A1 | 11/2005 | Miller | |
| 2007/0035387 A1* | 2/2007 | Forster | 340/447 |

* cited by examiner

*Primary Examiner*—Andre J Allen
(74) *Attorney, Agent, or Firm*—Marsteller & Associates, P.C.

(57) ABSTRACT

A pressure sensor (S) includes an antenna member (10) that is adapted to be resonantly responsive to a desired frequency of electromagnetic radiation (12). An inductance changing body formed from a compressible dielectric material (14) is positioned in proximity to the antenna member (10). A housing member (16) houses the antenna member (10) in a desired proximity to the compressible dielectric material (14). The compression of the dielectric material (14) changes the effective dielectric constant of the antenna (10).

4 Claims, 9 Drawing Sheets

RESONANT FREQUENCY PRESSURE SENSOR

BACKGROUND OF THE INVENTION

1. Technical Field

The invention relates to the field of pressure sensors and more particularly to a passive system measuring pressure using radar technology.

2. Background Art

Figure 12:
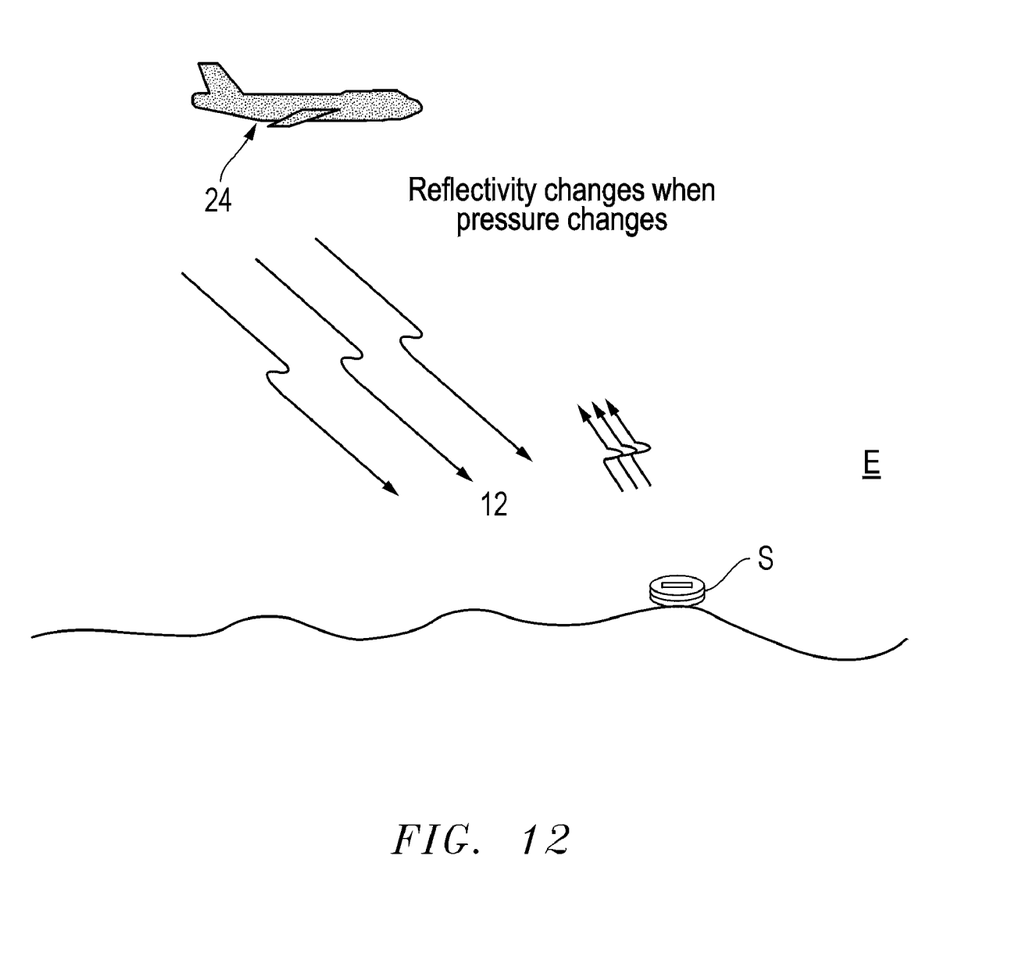
FIG. 12 is an illustration of an airplane using a radar system to read pressure from a sensor of the present invention.

Radar systems and the like use the reflective properties of objects to gather information from a distance. Pressure is not something that radar can detect on its own. A pressure sensor is needed to aid radar in reading pressure. See FIG. 12.

The pressure sensor of the present invention differs from known prior art in that the present pressure sensor is a passive system measuring reflectivity of an RF or electromagnetic (EM) signal, and not just being put into an active system.

For example, U.S. Pat. No. 6,919,521 to Brian L. Miller et al. discloses a pressure sensor that could be made, but fails to teach measuring pressure with an effective dielectric change causing a resonant frequency change. The '521 patent discloses changing the distance between the ground plane and the resonator, or volumetric changes, but does not actually suggest a mechanism for either changing the effective dielectric constant of the resonator or changing the distance between a permanent magnet and the resonator. Unlike the '521 patent disclosure, the present invention uses a membrane to compact a high dielectric material down so that the effective constant rises which shifts the resonant frequency. The '521 patent disclosure also teaches a dielectric filler material being used to measure changes in capacitance, but not resonant frequency shifting. When resonant frequency shifting is mentioned, the '521 patent disclosure links resonant frequency shifting with volumetric changes and proximity with the ground plane changes. Also the '521 patent fails to specify how to measure the resonant frequency shift.

Also, US Published Patent Application No. 2004/0159158 A1 by Ian J. Forster (Forster) is a capacitive pressure sensor. The Forster device uses a foam dielectric to measure capacitance change and outlines attaching it to a system for measuring capacitance. An antenna is disclosed as being part of the capacitor, and further teaches that the foam could disrupt the antenna.

While the above cited references introduce and disclose a number of noteworthy advances and technological improvements within the art, none completely fulfills the specific objectives achieved by this invention.

DISCLOSURE OF INVENTION

In accordance with the present invention, a pressure sensor includes an antenna member that is adapted to be resonantly responsive to a desired frequency of electromagnetic radiation. A compressible dielectric material is positioned in proximity to the antenna member. A housing member houses the antenna member in a desired proximity to the compressible dielectric material. The compression of the dielectric material changes the effective dielectric constant of the antenna.

In a second embodiment of the present invention, the pressure sensor includes an antenna member that is adapted to be resonantly responsive to a desired frequency of electromagnetic radiation. A magnetic body is positioned in proximity to the antenna member and is movable along an essentially perpendicular axis to the antenna member. A housing member houses the antenna member in a fixed location relative to the movable magnetic body.

Radar systems generally have to cover large areas; so, a low cost widely distributable, almost disposable, pressure sensor would have a large number of military and commercial uses. Some of these uses include a highly reliable passive wireless airplane wing sensors used to detect the onset of a stall. A large number of slow falling passive wireless sensors could be dropped into a hurricane for detailed pressure readings. Customized passive pressure sensors could be used for air conditioning/ventilation system pressure balancing sensors. Threshold pressure sensors could be used to seed a ground area and determine if someone had walked or driven through recently. A large number of low cost passive pressure sensors could be dropped around a target site for blast energy indicators for battle damage assessment. The pressure sensor of the present invention could easily be integrated into active RF systems as a more cost effective alternative to micro-electromechanical systems (MEMs) pressure sensors. Another extension of the concept of the present invention could be using the pressure sensor concept to change the operating frequency of a radome structure by changing the pressure inside or outside the radome.

The present resonant frequency pressure sensor measures change in RF characteristics of a foam layer applied to a microstrip when the foam is depressed or placed under pressure. One practical implementation is to create a resonant frequency on a microstrip line. When the high dielectric material is depressed the resonant frequency will shift which can be used in an oscillator as an active sensor or as part of an antenna in a passive transponder.

A radar system uses a transmitter to broadcast high power electromagnetic energy, the energy strikes an object and reflects a portion and a receiver is used to measure the reflected waves. Three different antennas are used during this process: transmit antenna, receive antenna, and the object that reflects the waves acts as an antenna. The more effective that each antenna is at resonating important frequencies the better the radar system will be able to measure the reflected radiation. In a first embodiment, if a pressure change shifts the resonant frequency of the antenna a compatible receiver will be able to measure it. Alternatively, if a pressure change destroyed the antennas ability to resonate electromagnetic waves, then a radar system could detect it.

So a micro-strip patch antenna will reflect a signal much better than surrounding objects. A simple patch antenna could be a micro-strip that is a quarter of a wavelength long. The reason it needs to be a quarter of a wavelength is so the incident radar signal will resonate. A resonating wave on a micro-strip patch antenna will reflect from end to end and constructively interfere with itself. Each time the wave reflects a little bit of the electromagnetic wave is transmitted back to the radar receiver. The reason the wave reflects at the end of an antenna is because of the impedance change going from antenna to air.

The impedance of the micro-strip is very important to the antennas ability to resonate electromagnetic waves. A wave reflects off of a boundary when an impedance change occurs. If the wave encounters an impedance change in the middle of the antenna instead of at the end it will break up the quarter wave micro-strip into shorter segments that cannot resonate at the same frequency.

The present invention is a cost expensive passive resonant pressure sensor that can measure pressure from long distances using radar technology. In a first embodiment, a micro-strip antenna resonates at a specific frequency. A radar unit sees the antenna resonance as a reflection at a certain frequency. Changing the effective dielectric constant of the micro-strip antenna shifts the resonant frequency. A low loss high dielectric foam material (Polyvinylidene Fluoride, for example) can be deposited on top of the micro-strip and is used as a mechanism for shifting the resonant frequency. When ambient pressure changes the foam compresses and raises the effective dielectric constant of the antenna.

In a second embodiment, when an airplane flies over one, or many, of the pressure sensors of the present invention, the pressure sensor(s) will be able to read pressure by the reflected electromagnetic energy. The reflective properties of this resonant pressure sensor change when pressure changes. An increase in pressure will cause the antenna to change from reflecting electromagnetic energy of a certain frequency to not reflecting energy or even absorbing electromagnetic energy. This pressure sensor has no onboard electronics, so it will be a lot more reliable and cheaper to manufacture than any other sensor available.

The present invention could have commercial uses in the medical industry and auto industry. In the medical industry pressure sensors could be used as a very reliable implantable pressure sensor for any type of prosthetic organ. Relating to the auto industry, the present pressure sensors could be adapted to be used to read tire pressure on cars.

These and other objects, advantages and preferred features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

Figure 1:
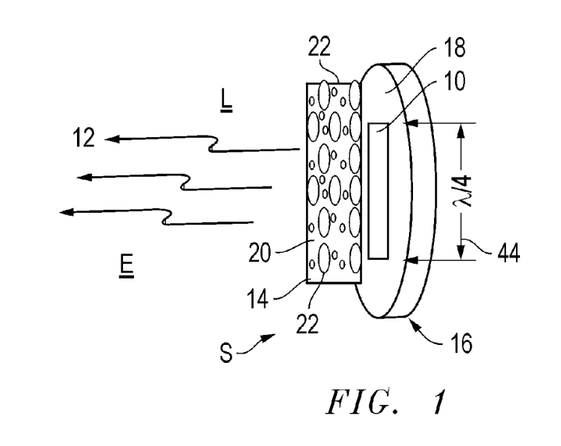
FIG. 1 is an elevational view from the left side of a pressure sensor of the present invention with depressible foam in a low pressure state.
Figure 2:
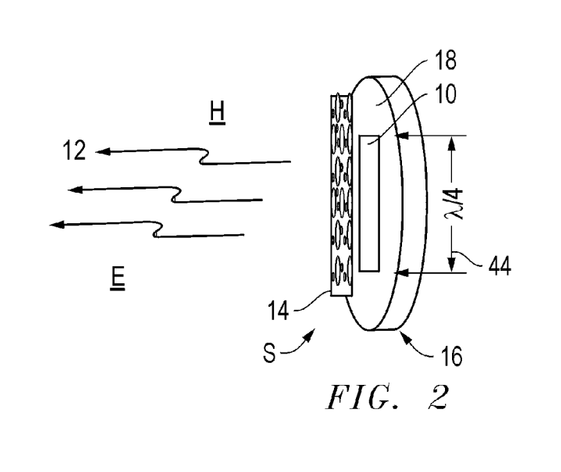
FIG. 2 is an elevational view from the left side of the pressure sensor of FIG. 1 with the depressible foam in a high pressure state.

In a first embodiment, a pressure sensor S includes an antenna member 10 that is adapted to be resonantly responsive to a desired frequency of electromagnetic radiation 12. An inductance changing member formed from a compressible dielectric material 14 is positioned in proximity to the antenna member 10. A housing member 16 houses and maintains the antenna member 10 in a desired proximity to the compressible dielectric material 14, or vice versa. The compression of the dielectric material 14 represented by the transition from FIGS. 1 to 2 changes the effective dielectric constant of the antenna 10. The compressible dielectric material 14 compresses in response to changes in the environment E of the pressure sensor unit S.

In a second embodiment, the pressure sensor includes an antenna member that is adapted to be resonantly responsive to a desired frequency of electromagnetic radiation. A magnetic body is positioned in proximity to the antenna member and is movable along an essentially perpendicular axis to the antenna member. A housing member houses the antenna member in a fixed location relative to the movable magnetic body.

In the first embodiment, a quarter wave micro-strip antenna 10 resonates at a specific frequency based on the effective dielectric of the substrate 18 it sits on or to which it is attached. Foam 14 made of a high dielectric material 20 is basically a matrix of air (dielectric constant of 1) 22 and dielectric material (dielectric constant of 8) 20. When the foam 14 is depressed, the air displacements or pockets are squeezed or effectively replaced with dielectric material 20. The foam 14 compression increases the effective dielectric constant of the micro-strip antenna 10 changing the inductance within the antenna 10 (and consequently the impedance of the antenna 10 since inductance and impedance are related by the equation $Z_L=j\omega L$, where L is the inductance in Henrys). An increase in dielectric constant will cause the resonant frequency to shift to the left in the graphs shown in FIGS. 1a and 2a, for example. A known radar or other EM system 24 of receiver and transmitter units that scans over a selected frequency range will be able to scan the sensor S and see a change in resonant frequency of the reflected EM radiation 12.

The resonant pressure sensor S is made of a micro-strip antenna 10 that is chosen for its suitability for the desired RF or EM signal attached to a housing 16 with a side wall 26 made from a plastic or other suitable material appropriate for the RF frequency use. The plastic housing 16 adds some mechanical strength to the sensor S and could be bonded using a good adhesive.

The foam dielectric 14 is inserted inside the plastic housing 16 before it is sealed. For this first embodiment, the foam 14 could preferably be a known open celled material to reduce temperature effects. A more cost effective, but less accurate, sensor S could use closed celled foam directly deposited onto the micro-strip 10 without any covering membrane 28. Temperature effects should be calibrated out at the receiver 24 of the EM system 24.

Changing the effective dielectric constant of the micro-strip antenna 10 shifts the resonant frequency. Small changes in the effective dielectric constant generally have large impacts on the resonant frequency shifting and the inductance of the antenna 10. A low loss high dielectric foam material (Polyvinylidene Fluoride (PVDF), for example) 20 can be deposited on top of the micro-strip 10 and is used as a mechanism for shifting the resonant frequency. When ambient pressure or other characteristics of the environment E surrounding the pressure sensor S changes, the dielectric foam 14 compresses and raises the effective dielectric constant of the antenna 10. An example would be a 18% increase in dielectric constant would still produce a significant shift in resonant frequency, such as a 6 MHz resonant frequency shift at a normal resonant frequency of approximately 20 MHz.

Figure 1A:
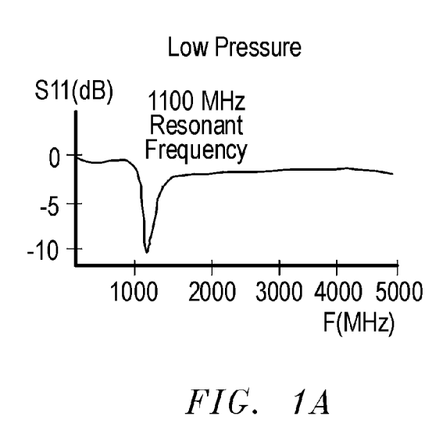
FIG. 1a is a representative graph showing a resonant frequency for the microstrip antenna of FIG. 1.
Figure 2A:
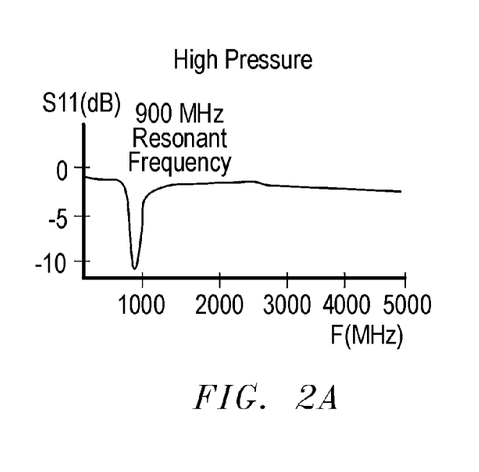
FIG. 2a is a representative graph showing a resonant frequency for the microstrip antenna of FIG. 2.
Figure 6:
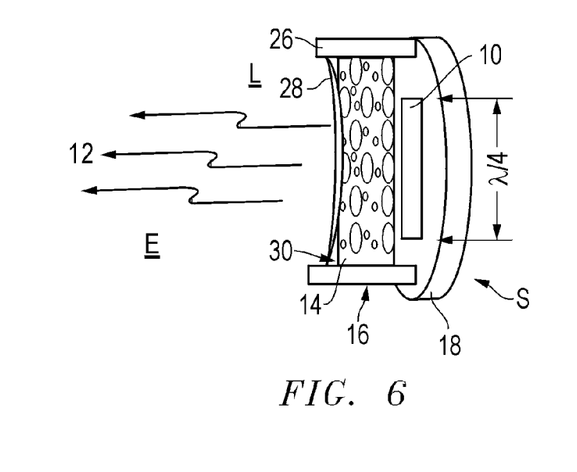
FIG. 6 is an elevational view from the left side of a pressure sensor of the present invention with depressible foam inside a housing and the foam being in a low pressure state.
Figure 6A:
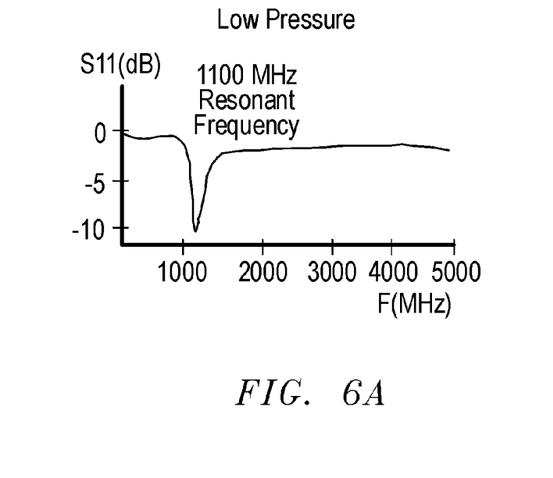
FIG. 6a is a representative graph showing a resonant frequency for the microstrip antenna of FIG. 6.
Figure 7:
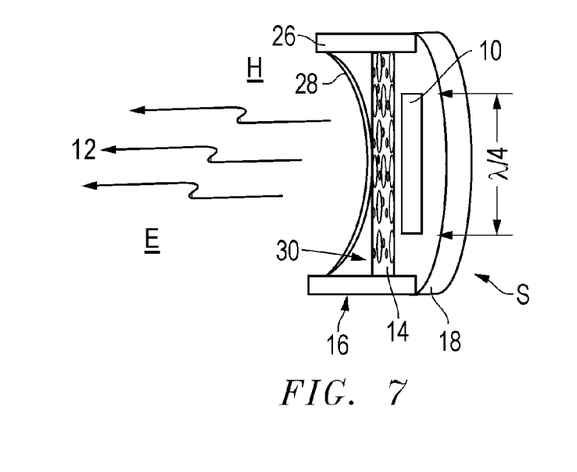
FIG. 7 is an elevational view from the left side of the pressure sensor of FIG. 6 with the depressible foam located inside the housing and the foam being in a high pressure state.
Figure 7A:
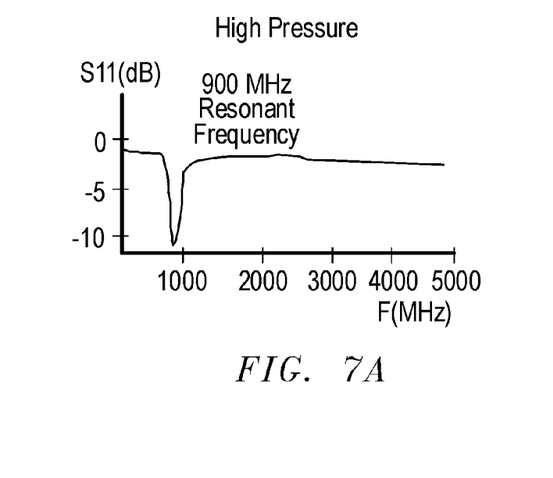
FIG. 7a is a representative graph showing a resonant frequency for the microstrip antenna of FIG. 7.

When the pressure decreases L as is shown in FIG. 6, a covering membrane 28 will allow the foam 14 to expand into the void or cavity 30 and move away from the micro-strip 10. The dielectric material 20 will be replaced with more or larger pockets of air 22 and cause the resonant frequency to shift to the right or increase as shown in the graphs of FIGS. 1a and 2a. When environmental pressure increases H in FIG. 7, the membrane 28 will compress the foam closer together and increase the dielectric constant of the antenna 10.

In a second embodiment, changing the impedance of a micro-strip antenna 10 is as easy as moving a piece or member of Ferrite or other comparable material 40 close to the antenna 10 along an axis 42 essentially perpendicular to the longitudinal axis 44 of the antenna 10.

Figure 3:
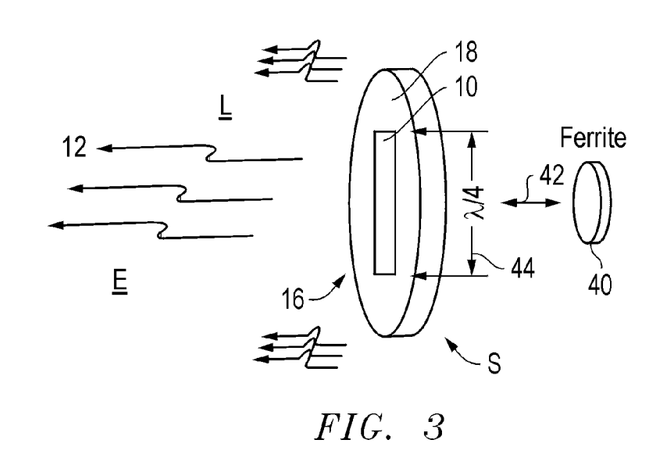
FIG. 3 is an elevational view from the left side of a resonant pressure attenuator of the present invention with a ferrite object positioned in a first, distant location state.
Figure 3A:
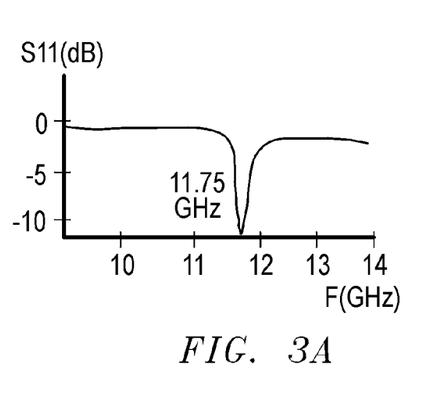
FIG. 3a is a representative graph showing a resonant frequency for the microstrip antenna of FIG. 3.
Figure 4:
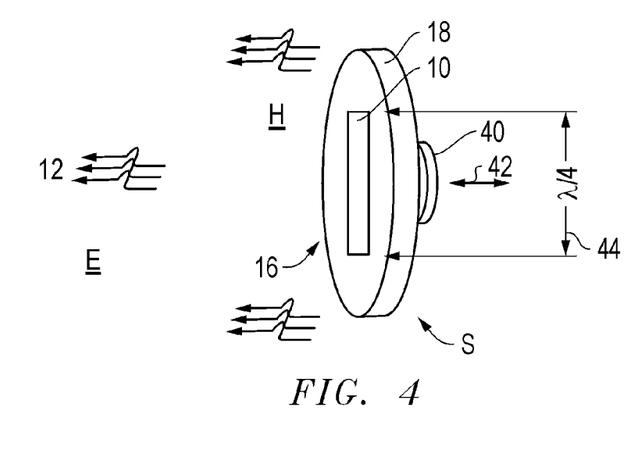
FIG. 4 is an elevational view from the left side of the resonant pressure attenuator of the present invention with a ferrite object positioned in a second, near location state.
Figure 4A:
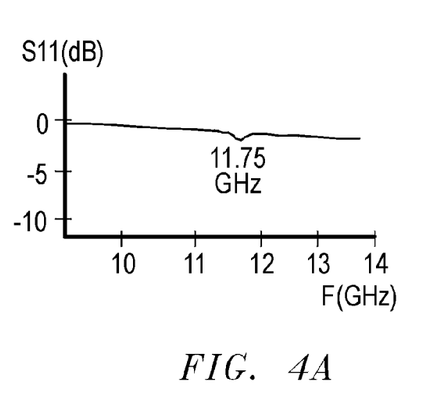
FIG. 4a is a representative graph showing a resonant frequency for the microstrip antenna of FIG. 4.
Figure 5:
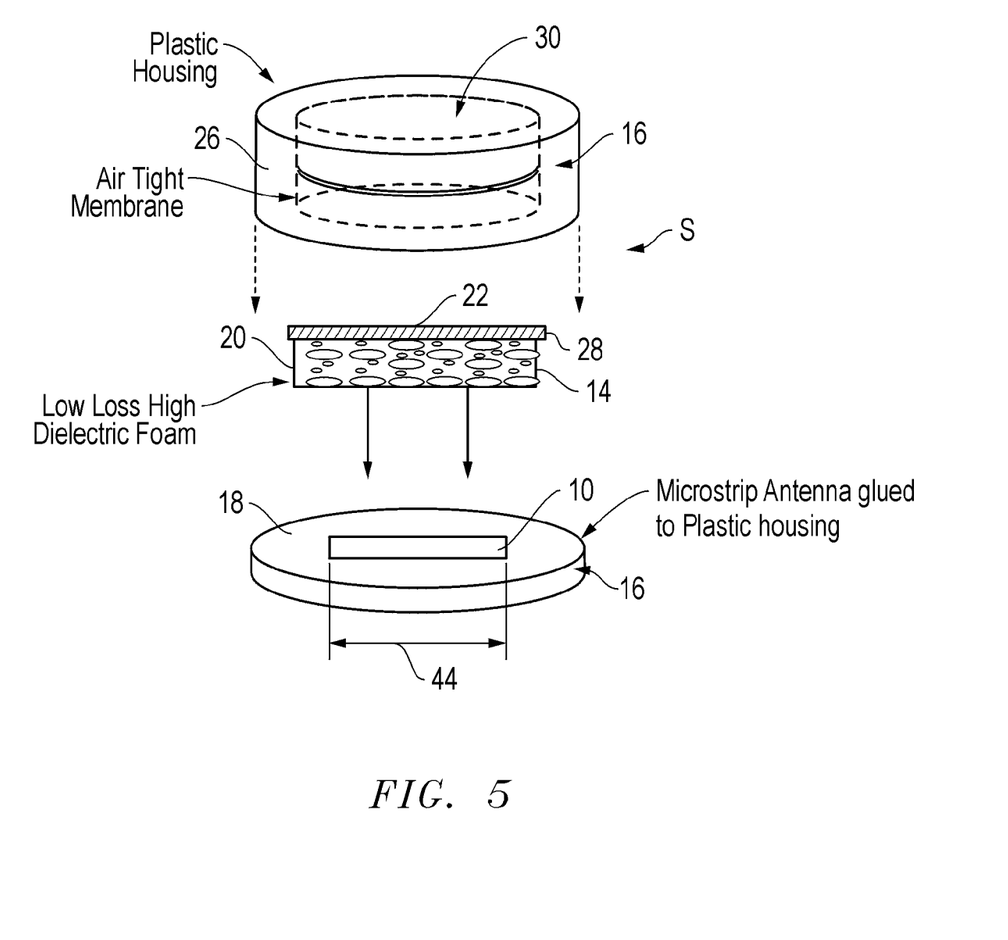
FIG. 5 is an exploded view of a first embodiment of the pressure sensor of the present invention.

Ferrite is a solid solution of carbon in body-centered cubic iron and is a known permanent magnet material that has a very strong magnetic field. When the magnetic or Ferrite body 40 is close to the micro-strip antenna 10, it will cause a large increase in inductance in the antenna 10. The closer the piece 40 of Ferrite is to the micro-strip 10, the more the inductance will choke off the antenna's ability to resonate. It will create an impedance discontinuity in the resonant micro-strip antenna 10. FIGS. 3a and 4a together illustrate this simple concept.

Figures 8, 8A:
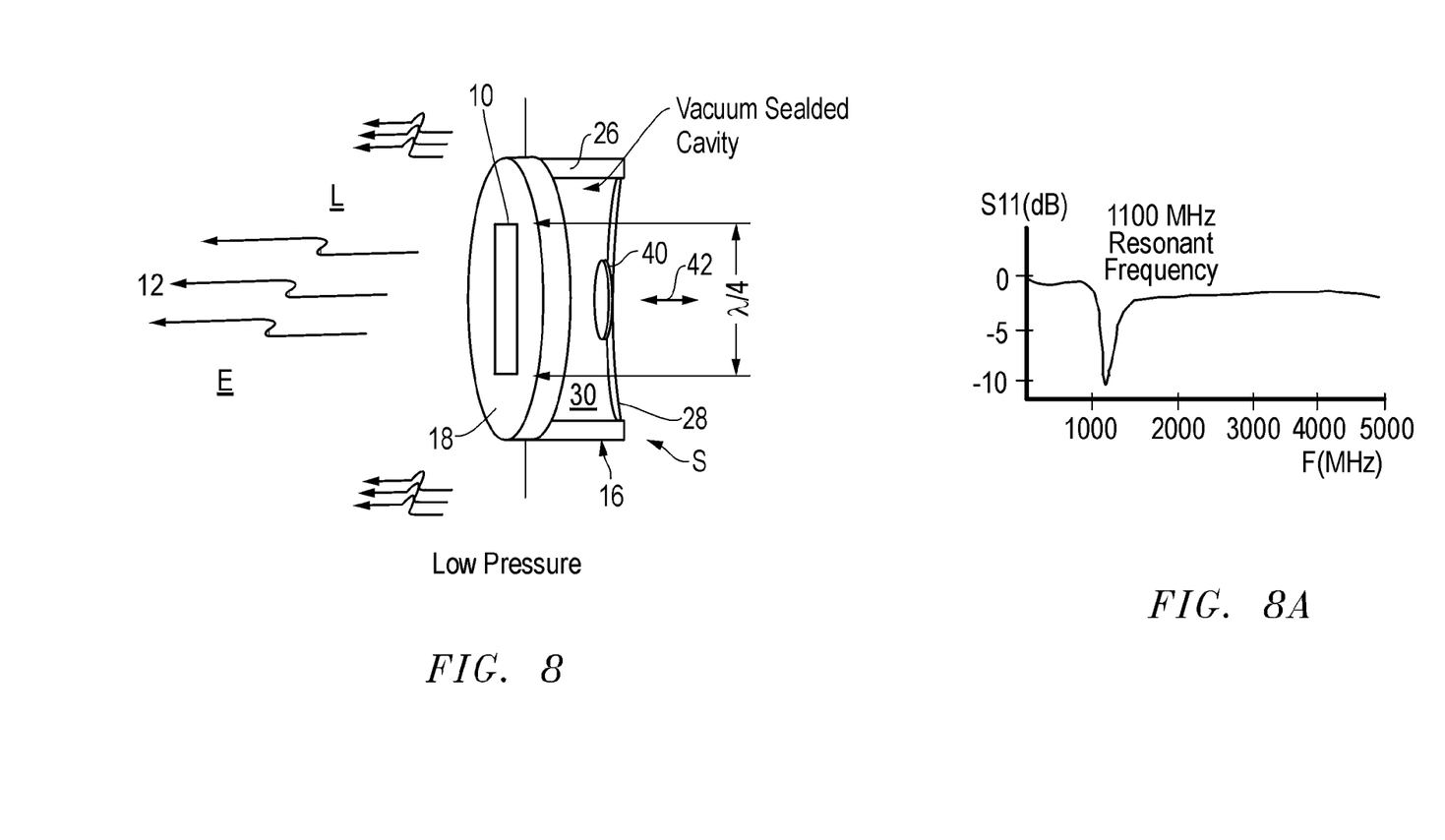
FIG. 8 is a cross sectional view of the resonant pressure attenuator of the present invention with the ferrite object located within a vacuum sealed membrane chamber and at a low pressure state.
FIG. 8a is a representative graph showing a resonant frequency for the microstrip antenna of FIG. 8 with the resonant frequency at 1100 MHz and the permanent magnet being at an extended distance from the antenna.
Figure 9:
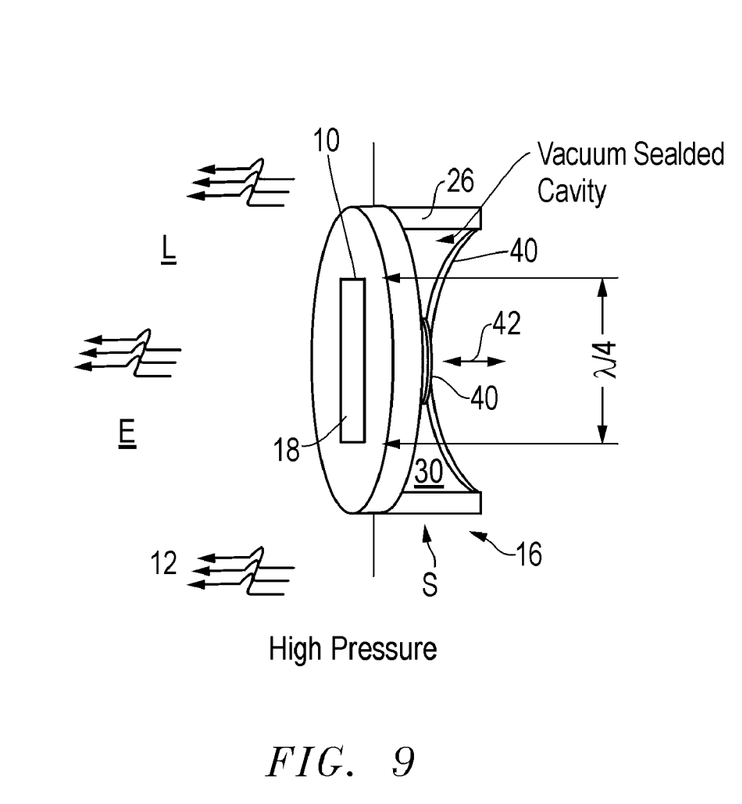
FIG. 9 is a cross sectional view of the resonant pressure attenuator of FIG. 8 at a low pressure state.
Figure 9A:
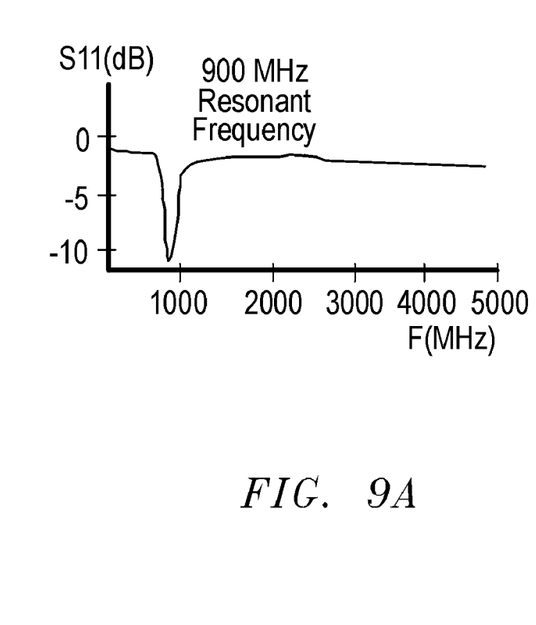
FIG. 9a is a representative graph showing a resonant frequency for the microstrip antenna of FIG. 7 with the resonant frequency at 1100 MHz and the permanent magnet being at a reduced distance from the antenna.
Figure 10:
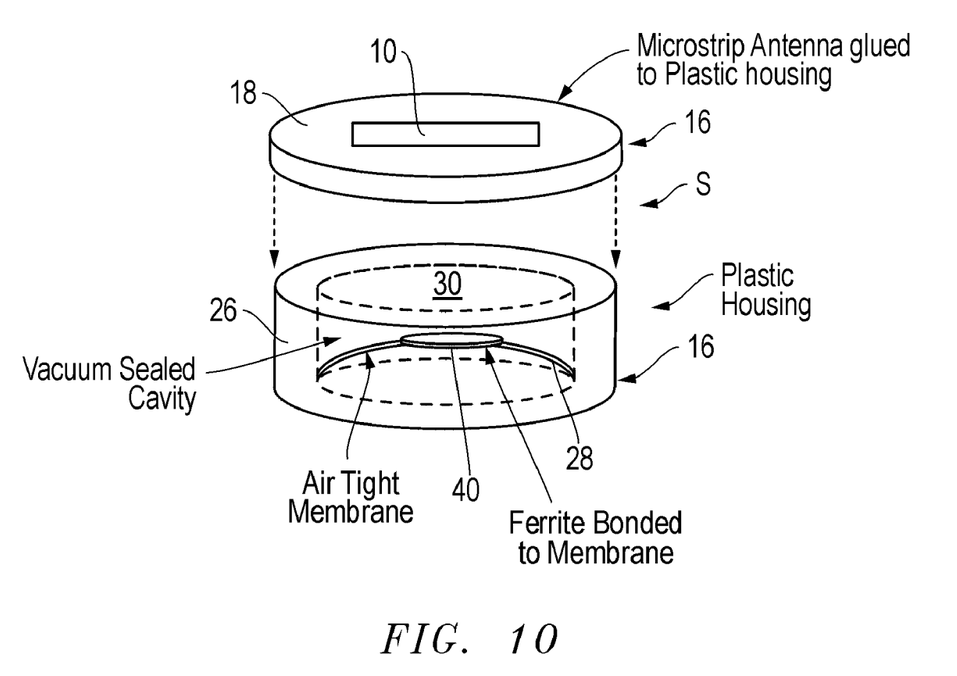
FIG. 10 is an exploded view of an embodiment of the present resonant pressure attenuator.

If the Ferrite member 40 is attached to a deformable membrane 28 and vacuum sealed to the back of an antenna 10, the Ferrite member 40 may move closer (a second position shown in FIGS. 4 and 9) or further away (a first position shown in FIGS. 3 and 8) depending on the ambient pressure of the environment E surrounding the pressure sensor S. The membrane 28 can be made of a plastic bonded thermally to a wall of the plastic housing 16 forming a drum-like void or chamber 30.

A vacuum seal can be created by removing the air out of a chamber 30 formed in the plastic housing assembly 16 using a known technique. A vacuum seal could also be made if the membrane 28 is thermally bonded in a vacuum ambient environment. The vacuum will greatly reduce temperature effects and provide a reference pressure.

The size of the piece 40 of ferrite can be used to tune the sensor. Membrane 28 flexibility is another variable used to alter the performance of the sensor S. So a more flexible membrane 28 with a larger piece 40 of ferrite would cause the antenna 10 to stop reflecting at a lower pressure, for example.

The resonant pressure attenuator S is made of a micro-strip antenna 10 attached to a plastic housing 16, as in the first embodiment, with a membrane 28 sealed to a side wall member 26 of the housing 16 forming a void or chamber 30. The piece of magnetic body or Ferrite 40 is attached to the approximate center of the deformable membrane 28. When pressure increases, the Ferrite 40 moves close to the antenna 10 and greatly decreases its reflectivity.

When any permanent magnet material is brought within a certain proximity of a stripline antenna, the permanent magnetic material will change the impedance of the antenna causing a shift in the resonating wave. The permanent magnet induces an increase in inductance that changes the peak of the resonating wave. A resonant frequency is a point where inductance and capacitance are somewhat in "conflict." Adding a magnetic field will change the resonant frequency causing the resonant frequency to shift to the left as shown in the figures. The greater the magnetic field, the more the inductive component will dominate. In the sensor of the first embodiment, when the foam dielectric is compressed, capacitance is increased causing the frequency to shift to the left in the figures. Both types of sensors could be used together to try and increase a frequency shift and make the frequency shift larger. The benefit of the second embodiment sensor over the foam dielectric form of the present sensor is that nothing is required to cover part or all of the reflective surface. With the foam dielectric sensor embodiment, the foam 14 is actually sitting on the reflective surface 18, which is going to present some loss to the reflected energy. Of course this is why the material selected would have a low dielectric loss tangent.

Figure 11:
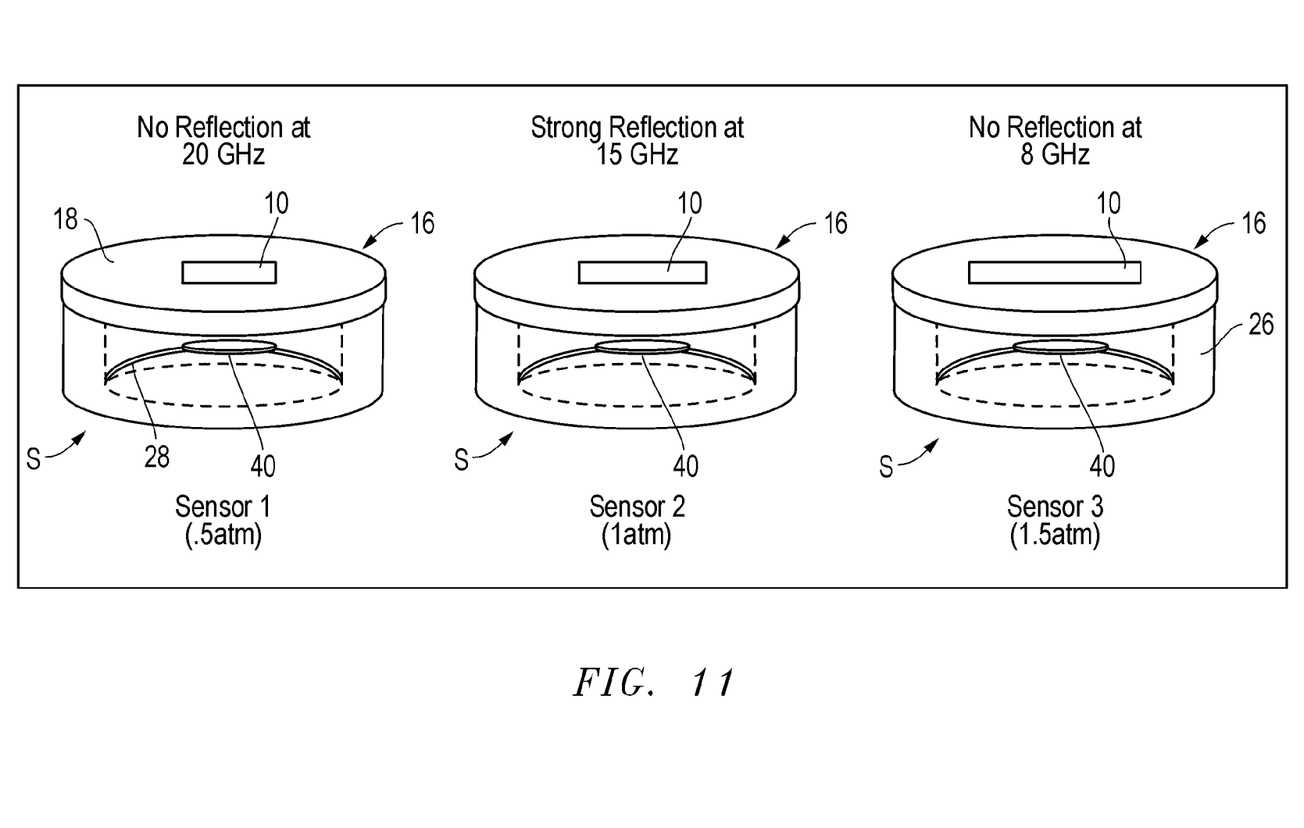
FIG. 11 is a series of illustrations of the resonant pressure attenuator of FIG. 10 at different exemplary pressure levels. Multiple pressure sensors are shown as being used to measure narrow down measurement to one pressure. Sensor 2 reflects 15 GHz strongly at 1 atm. While Sensors 1 and 3 show no reflection at there respective frequencies. So the current ambient pressure would be 1 atm.

Referring particularly to FIG. 11, each sensor would preferably be set up to have the strongest reflection close to a specific or desired pressure. For example, one sensor S will reflect the strongest at 1 atm. If multiple sensors were used at the same time, each sensor could be designed for a strong reflection at a different resonant frequency. Other sensors could be used at the same time to have the strongest reflection at 1.25 atm as an example. The other sensors would need to reflect different frequencies strongly.

It should also be known that ferrite dissipates electromagnetic energy as heat and does not generally reflect energy. This reason is why ferrite will work to attenuate the reflection in the present invention. Most permanent magnetic material will reflect energy. Ferrite absorbs the energy, which is why it is used in paints to help reduce the visibility of an airplane to radar. Painting with ferrite paint reduces reflected waves and therefore the object cannot be viewed by a radar as easily.

Each sensor S may be set up to have the strongest reflection close to a specific pressure. For example, one sensor S will reflect the strongest at 1 atm. If multiple sensors S are used at the same time, each sensor S would need a strong reflection at a different resonant frequency. Other sensors S could be used at the same time to have the strongest reflection at 1.25 atm. The other sensors S would need to reflect different frequencies strongly.

Additionally, the present sensor S measures a resonant frequency as a reflection to a radar receiver 24. The previously known sensors measure resonant frequency as a frequency shift unlike the present invention. The present sensor S may be easier to manufacture than the prior sensors. Also, the present invention would have no need for an on-board power supply.

The foregoing disclosure and description of the invention are illustrative and explanatory thereof, and various changes in the size, shape and materials, as well as in the details of the illustrated construction may be made without departing from the spirit of the invention.

The invention claimed is:

1. A pressure sensor comprising:
    an antenna member adapted to be resonantly responsive to a desired frequency of electromagnetic radiation;
    a compressible dielectric material having an effective dielectric constant positioned in proximity to the antenna member and operably connected with the antenna member for effecting a resonant frequency shift in the antenna member responsive to changes in the effective dielectric constant of the compressible dielectric material; and,
    a housing member for housing the antenna member in a desired proximity to the compressible dielectric material.

2. The invention of claim 1 wherein the compressible dielectric material comprises a resilient material.

3. The invention of claim 2 wherein the resilient material is Polyvinylidene Fluoride foam.

4. The invention of claim 1 wherein the antenna member is a micro-strip antenna.

* * * * *